May 6, 1969    R. C. REMINGTON ET AL    3,442,023
VERTICAL SENSOR
Filed Jan. 24, 1966

RICHARD C. REMINGTON
EUGENE H. BUHLER
INVENTORS

BY Thomas W. Kennedy
ATTORNEY

United States Patent Office 3,442,023
Patented May 6, 1969

3,442,023
VERTICAL SENSOR
Richard C. Remington, Pompton Plains, and Eugene H. Buhler, Ridgewood, N.J., assignors to General Precision Systems Inc., a corporation of Delaware
Filed Jan. 24, 1966, Ser. No. 522,745
Int. Cl. G01c 9/06
U.S. Cl. 33—206      4 Claims

ABSTRACT OF THE DISCLOSURE

An orientation sensing apparatus for determining the direction and magnitude of tilt from a null position about a horiztal tilt axis comprising a nonconductive enclosure the inner walls of which are a right, circular cylinder and a pair of flat ends enclosing the cylinder. Pairs of congruent, arcuate electrodes are symmetrically disposed on diametrically opposite sides of the interior of the enclosure with the electrodes of each pair embedded in respective recesses of end walls and facing each other along corresponding arcs. The enclosure is substantially half filled with electrolyte and in a null position, equal surface portions of the electrodes are covered. In response to tilt, however, the surfaces of one pair of electrodes become covered to a greater extent and the surfaces of the other pair to a correspondingly lesser extent.

The spacing between electrodes of each pair is low relative to the spacing between an electrode of one pair and an electrode of the other pair to minimize cross coupling effects.

The electrical paths between electrodes of each pair may form respective branches of an electrical bridge circuit which has a pair of matched resistors as the other two branches and by proper excitation of the circuit, the unbalance of the bridge produced by tilting of the sensor can be electrically detected.

---

The present invention relates to vertical sensors, and particularly to a wide-angle, liquid-level vertical sensor.

A prior-art vertical sensor is described in U.S. Patent Nos. 3,020,506 and 3,051,007, both of which are assigned to the same assignee as in this invention. Said prior-art vertical sensor comprises a casing having a tilt axis and having two side walls, two end walls, and top and bottom walls disposed on opposite sides of said axis and forming an elongate chamber, a current-carrying fluid disposed in said chamber having a longitudinally displaceable, insulating bubble disposed therein, a plurality of electrode plates oppositely mounted on said top and bottom chamber walls with respective plate surfaces contacting said bubble whereby the area of said contact surfaces and the current flow varies with the tilt angle about said axis.

One problem with said prior-art, bubble-type vertical sensor is that it is difficult to measure a large tilt angle.

In accordance with one embodiment of the present invention, the range of measurable tilt angle is substantially increased by filling the chamber with said fluid to the level of the tilt axis, and by placing the electrode plates in the side walls of the chamber.

Accordingly, it is one object of the invention to provide a wide-angle, liquid-level vertical sensor.

It is another object of the invention to provide a vertical sensor according to the aforementioned object, in which the ratio of instrument size to angle range is minimized.

It is a further object of the invention to provide a vertical sensor according to the aforementioned objects with improved linearity, in which the ratio of current flow to tilt angle is substantially constant.

It is a still further object of the invention to provide a vertical sensor according to the aforementioned objects with low impedance, in which the ratio of the impedance level to the power input is minimized.

To the fulfillment of these and other objects, the invention provides a vertical sensor comprising a hollow casing with a tilt axis and having axially-spaced side walls, a current-carrying fluid filling said casing approximately half-full, and a pair of oppositely-facing electrodes respectively mounted in said side walls and partly immersed in said fluid.

Other objects of the invention will become apparent upon reading the following description and accompanying drawings, wherein like parts are designated by like numerals throughout the several views, and wherein.

Figure 3:
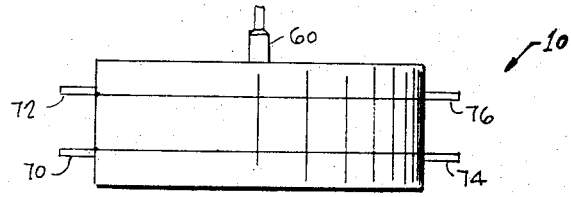
FIG. 3 is a sectional view on line 3—3 of FIG. 1.
Figure 1:
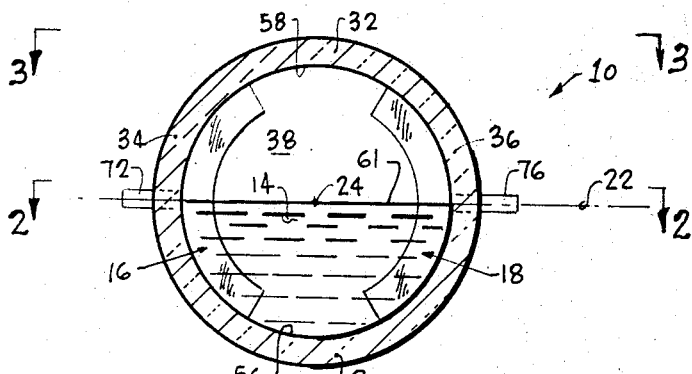
FIG. 1 is a sectional view of a vertical sensor embodying features of the present invention.
Figure 2:
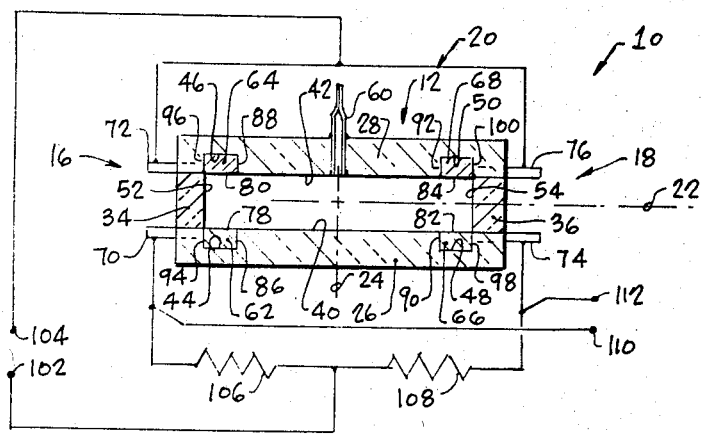
FIG. 2 is a sectional view on line 2—2 of FIG. 1.

Referring to FIG. 1, one embodiment of the present invention is a wide-angle, liquid-level vertical sensor 10. Sensor 10 (FIGS. 1, 2, 3) includes a hollow casing 12, a current-carrying fluid 14, which fills casing 12 to approximately half-full, a pair of electrode units 16, 18, which are mounted inside casing 12 and which are immersed in fluid 14, and a circuit 20, which is connected to electrode units 16, 18 for providing output signals.

Casing 12 has a longitudinal axis 22 and has a tilt axis 24, which intersects axis 22 substantially at right angles thereto. Casing 12 (FIGS. 1, 2) includes a pair of side walls 26, 28, bottom and top walls 30, 32, and a pair of end walls 34, 36, which are longitudinally spaced along axis 22, and which together enclose a chamber 38, in which fluid 14 is contained. For ease of construction, casing 12 is preferably composed of glass; and electrode units 16, 18 are preferably composed of platinum.

Side walls 26, 28 have inner faces 40, 42, which are substantially parallel to axis 22. Faces 40, 42 respectively have a pair of oppositely-facing recesses 44, 46, which are disposed adjacent wall 34 and have another pair of oppositely-facing recesses 48, 50, which are disposed adjacent wall 36. Walls 34, 36 have respective inner surfaces 52, 54, which are cylindrical in shape, which are arcuate in profile, and which are symmetrically disposed about axis 24. Walls 30, 32 also have respective inner surfaces 56, 58. Side wall 28 also has an elongate fill tube 60, which is integrally connected thereto, which projects axially-outwardly therefrom, which is coaxial therewith along axis 24, and which has a conventional construction.

The sensor 10 is, in general, configured to have a low ratio of instrument size to angular operating range and to derive the benefits of a relatively low volume of conductive fluid used, the spacing between electrodes on opposite sides of the sensor is made as low as possible, due consideration being given to the fact that the resistances between these electrodes over the operating range of the instrument must be of practical, tractable values.

Fluid 14 has a surface level 61, which is disposed in a plane substantially including axis 24, both in the instrument null condition and in the tilt condition of sensor 10.

Electrode units 16, 18 (FIG. 2) respectively include a pair of oppositely-facing electrode plates 62, 64, which are respectively received in recesses 44, 46; and also include a pair of oppositely-facing electrode plates 66, 68, which are respectively received in recesses 48, 50. Plates 62, 64 and 66, 68 are substantially identical to each other, are substantially uniform in thickness, are preferably arcuate in profile, and are preferably spaced equi-distant from axis 24. Plates 62, 64 and 66, 68 have respective terminals 70, 72 and 74, 76, which extend outwardly therefrom parallel to axis 22, and also have respective inner faces 78, 80 and 82, 84, which are respectively parallel to each other and which are also flush with the adjacent portions of faces 40, 42, whereby fluid 14 and surface level 61 have an equal capillary friction on side faces 40, 42 for better electric linearity. Plates 62, 64 and 66, 68 also have radial inner edges 86, 88 and 90, 92, which have a cylindrical shape with a substantially equal radius with a common center on axis 24 and also have radial outer edges 94, 96 and 98, 100, which also have a cylindrical shape of equal larger radius and with a common center on axis 24.

Circuit 20 (FIG. 2), which is a conventional bridge circuit and which is selectively connected to plates 62, 64 and 66, 68 includes a pair of AC power-supply terminals 102, 104, a pair of bridge resistors 106, 108, and a pair of output-voltage terminals 110, 112.

In this circuit, the electrical resistance of the fluid between electrodes 62 and 64 forms one leg of the bridge circuit, the electrical resistance between electrodes 66 and 68 forms another leg of the bridge circuit and resistors 106 and 108, respectively, form the other two legs of the bridge circuit. In the initial or null position of the sensor, the bridge circuit is balanced with no output at terminals 102 and 104 since equal areas of the electrodes are covered, the spacing between electrodes of the two pairs is equal and resistors 106 and 108 are matched. However, in response to tilt of the sensor about its axis 24, the electrodes of one pair are covered with fluid to a greater extent and electrodes of the other pair are covered to a correspondingly lesser extent. Since the electrical impedance between electrodes of a pair varies inversely with the surface area of the electrodes covered, the bridge circuit becomes unbalanced with one leg decreasing in impedance and the other increasing in impedance. This is manifested by the output potential at terminals 102 and 104.

With this construction, a wide angle sensor 10 is provided, which has a high resolution and a high accuracy. In addition, the ratio of instrument length to angular range is minimized where the ratio of instrument size to performance level is minimized.

With the construction of electrodes 16, 18, plate faces 78, 80 and 82, 84 have equally immersed areas at null condition, and also have successively equal increments of immersed areas at successively equal increments of tilt angle whereby the sensor output signals have an improved linearity.

With this construction, the gap between electrode plates and chamber width can be minimized whereby the impedance rating of sensor 10 can be minimized. With the arrangement of electrodes 16, 18, sensor 10 can operate in a normal position (FIG. 1), and can also operate equally well in an upside-down position, that is with sensor 10 rotated 180° about tilt axis 24 from such normal position, whereby sensor 10 is useful in leveling gyro platforms.

In summary, this invention provides a wide-angle, liquid-level vertical sensor, in which the ratio of instrument size to angle range is minimized, in which the ratio of current flow to tilt angle or linearity is substantially constant, and in which the ratio of the impedance level to the power input is minimized.

While the present invention has been described in a preferred embodiment, it will be obvious to those skilled in the art that various modifications can be made therein within the scope of the invention. For example, sensor 10 can be converted to a two-axis type of sensor by adding a second chamber disposed substantially at right angles to said first chamber 38 with fluid 14 in communication between both said chambers, said second chamber having a similar wall construction so that the overall plan shape of sensor 10 (FIGS. 2 and 3) is in the shape of a cross with its section along tilt axis 24 corresponding to its section along longitudinal axis 22 (FIG. 1).

What is claimed is:

1. A vertical sensor comprising an enclosure having a tilt axis, a first pair of electrodes located within said enclosure in radially-spaced symmetry about said tilt axis, a second pair of electrodes located within said enclosure, said second pair of electrodes being congruently disposed relative to said first pair and being equidistantly axially-spaced therefrom along said tilt axis, and an electrically conductive fluid filling substantially one half of said enclosure and partially covering each of said electrodes whereby said axially-spaced congruently disposed corresponding electrodes in each said first and second pair form a pair of electrical circuit paths respectively and the cross-coupling effects between the electrodes in each said first and second pair are minimized, said electrodes having substantially planar, facing surfaces, and said enclosure further having a pair of axial end walls recessed to receive said first and second pairs of electrodes respectively whereby the opposing facing surfaces of said electrodes are flush with the axial end walls of said enclosure.

2. A vertical sensor as claimed in claim 1, wherein said electrodes are arcuate in cross-section and equidistantly spaced from said tilt axis wherein the current level is proportional to the tilt angle of said casing.

3. A vertical sensor as claimed in claim 1, additionally comprising bridge circuit means including the electrical path between electrodes of each pair as two legs of the bridge circuit whereby tilt of said sensor about said tilt axis is effective to affect the electrical balance of said bridge circuit to provide an electrical indication of said tilt in response to electrical excitation of the circuit.

4. A vertical sensor as claimed in claim 1, in which said enclosure comprises a round circular cylinder having its axis along said tilt axis and a flat surface at each end closing said cylinder comprising said end walls and in which the arcuate surfaces of said electrodes are portions of circles having said axis as the center of curvature and in which the planar surfaces of opposed electrodes are substantially parallel.

References Cited

UNITED STATES PATENTS 3,171,213  3/1965  Swarts et al. _____ 33—206.56
2,713,727  7/1955  Balsam _____ 33—211

FOREIGN PATENTS 63,830  1941  Norway.

LEONARD FORMAN, *Primary Examiner.*

R. A. FIELDS, *Assistant Examiner.*